(12) United States Patent
Suzuki et al.

(10) Patent No.: US 8,352,655 B2
(45) Date of Patent: Jan. 8, 2013

(54) PACKET COMMUNICATION DEVICE WHICH SELECTS AN APPROPRIATE OPERATION MODE

(75) Inventors: Jun Suzuki, Tokyo (JP); Youichi Hidaka, Tokyo (JP); Junichi Higuchi, Tokyo (JP); Shigeyuki Yanagimachi, Tokyo (JP); Takashi Yoshikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/007,658

(22) Filed: Jan. 14, 2008

(65) Prior Publication Data

US 2008/0172514 A1 Jul. 17, 2008

(30) Foreign Application Priority Data

Jan. 15, 2007 (JP) ................................. 2007-005863

(51) Int. Cl.
G06F 13/00 (2006.01)
G06F 3/00 (2006.01)
G06F 13/42 (2006.01)
G06F 13/36 (2006.01)
G06F 13/20 (2006.01)

(52) U.S. Cl. ............ 710/104; 710/14; 710/16; 710/105; 710/311; 710/313; 710/314

(58) Field of Classification Search .......... 710/301–304, 710/104, 105, 106, 311, 313–314, 11, 14, 710/16
See application file for complete search history.

(56) References Cited

U.S. PATENT DOCUMENTS

| 7,054,979 | B2 | 5/2006 | Streitenberger et al. |
| 2005/0080935 | A1 | 4/2005 | Fukae et al. |
| 2005/0138231 | A1 | 6/2005 | Yamaguchi et al. |
| 2005/0251609 | A1* | 11/2005 | Chou et al. ..................... 710/313 |
| 2005/0262269 | A1 | 11/2005 | Pike |
| 2005/0270988 | A1* | 12/2005 | DeHaemer ..................... 370/254 |
| 2006/0037015 | A1* | 2/2006 | Mihai ............................ 717/176 |
| 2007/0276981 | A1* | 11/2007 | Atherton et al. .............. 710/307 |

FOREIGN PATENT DOCUMENTS

| JP | 10-289199 A | 10/1998 |
| JP | 2000-4274 A | 1/2000 |
| JP | 2000-066992 A | 3/2000 |
| JP | 2001-167047 A | 6/2001 |
| JP | 2002-207688 A | 7/2002 |
| JP | 2004-334780 A | 11/2004 |
| JP | 2005-129010 A | 5/2005 |
| JP | 2005-182624 A | 7/2005 |
| JP | 2005-332396 A | 12/2005 |

OTHER PUBLICATIONS

"PCI Express to PCI/PCI-X Bridge Specification" Revision 1.0. Jul. 14, 2003. PCI-SIG. pp. 1-176.*

(Continued)

*Primary Examiner* — Thomas J Cleary
(74) *Attorney, Agent, or Firm* — Foley & Lardner LLP

(57) ABSTRACT

A packet communication device autonomously selects an appropriate operation mode according to a connection environment to an external device before a service of the device is started. When the device is connected to the external buses, connection interface units notify an external device discrimination unit of connection of the device. The external device discrimination unit issues a polling packet to the connected device, discriminates the connected external device on the basis of the response packet, and notifies an operation mode switching unit. The operation mode switching unit selects an operation mode conforming to a connection environment of the packet communication device to the external device and switches the operation mode of the device to the mode. The selection of the operation modes is completed before the entire device or a portion of the device which is influenced by the selection of the operation mode starts a service to the external device to which the packet communication device is connected.

18 Claims, 7 Drawing Sheets

OTHER PUBLICATIONS

"Universal Serial Bus Specification". Revision 1.1. Sep. 23, 1998. Compaq Computer Corporation, et al. Sections 9.1.2-9.7.3. pp. 179-206.*

"PCI Express Base Specification". Revision 1.0. Apr. 29, 2002. PCI-SIG. pp. 1-2 and 33-34.*

Japanese Office Action for Japan application No. 2007-005863; Nov. 26, 2008; 2 pages.

Japanese Office Action for Japan application No. 2007-005863; Apr. 28, 2009; 3 pages.

* cited by examiner

PACKET COMMUNICATION DEVICE WHICH SELECTS AN APPROPRIATE OPERATION MODE

BACKGROUND OF THE INVENTION

1. Field of the Invention

The present invention relates to a packet communication device, a packet communication method, and a recording medium on which a packet communication program is recorded, and particularly, a packet communication device which autonomously set an operation mode, a packet communication method, and a packet communication program.

This application is based upon and claims the benefit of priority from Japanese patent application No. 2007-005863, filed on Jan. 15, 2007, the disclosure of which is incorporated herein in its entirety by reference.

2. Description of Related Art

A packet communication device of this type is connected to buses, selects an appropriate operation mode of the device according to a connection environment to the outside, and operates to conform an operation of the device to the connection environment. An example of the packet communication device is described in Japanese Patent Application Laid-Open No. 2000-66992 (JP-A 2000-66992). The packet communication device is shown in FIG. 7.

A packet communication device 73 described in JP-A 2000-66992 shown in FIG. 7 sets a connection between structural units inside a device in accordance with a connection environment to the outside. In this case, the connection environment corresponds to case in which a primary side and a secondary side are set to two external buses connected by the packet communication device 73 and the primary interface and the secondary interface must be connected to the primary external bus and the secondary external bus, respectively. The packet communication device 73 includes a connection control unit 731, a primary interface 732, a secondary interface 733, a connection control unit 734, and an operation mode control unit 735. The connection control unit 731 is connected an external bus 71 and switches connection paths to an internal block depending on whether the external bus 71 is on the primary side or the secondary side. The connection control unit 734 is connected an external bus 74 and switches connection paths to the internal block depending on whether the external bus 74 to be connected is on the primary side or the secondary side. The primary interface 732 is connected to the primary external bus and the secondary interface 733 is connected to the secondary external bus. The operation mode control unit 735 controls a connection between the connection control unit 731 and the connection control unit 734 by a designation of the control bus 72.

The operation mode control unit 735 receives a control signal from the control bus 72. The control signal notifies that the external bus 71 or the external bus 74 is the primary bus. By using the information, the connection control unit 731 is connected to one of the primary interface 732 and the secondary interface 733, and the connection control unit 734 is connected to the other of primary interface 733 and secondary interface 732. According to this setting, the primary interface 732 is connected to the primary bus, and the secondary interface 733 is connected to the secondary bus.

A first disadvantage of the packet communication device is that a system administrator or management software must set an appropriate operation mode of the packet communication device according to connection environment to the outside of the device.

A second disadvantage of the packet communication device is that a physical device or dedicated software to set an operation mode of a packet communication device is necessary.

SUMMARY OF THE INVENTION

It is an exemplary object of the present invention to provide a packet communication device which autonomously selects an appropriate operation mode according to a connection environment to the outside, a packet communication method, and a packet communication program.

It is another exemplary object of the invention to provide a packet communication device which does not require a physical device or dedicated software to set an operation mode, a packet communication method, and a packet communication program.

According to a first exemplary aspect of the present invention, there is provided a packet communication device including a connection interface unit for connecting to an external device; an external device discrimination unit which receives a notice of a connection to the external device from the connection interface unit, transmits a polling packet to the connected external device and discriminates the external device on the basis of a response packet to the polling packet; and an operation mode switching unit which selects an operation mode of a device conforming to a connection environment between the packet communication device and the connected external device.

According to a second exemplary aspect of the present invention, there is provided a packet communication device including: a connection interface unit for connecting to an external device; an external device discrimination unit which receives a broadcast packet from the connected external device through the connection interface unit and discriminates the connected external device on the basis of information on connection conditions given by the broadcast packet; and an operation mode switching unit which selects an operation mode of a device conforming to a connection environment between the packet communication device and the external device.

According to a third exemplary aspect of the present invention, there is provided a packet communication method including: recognizing a connection to an external device and issuing a polling packet to the connected external device, by a packet communication device; and selecting an operation mode conforming to a connection environment to the external device on the basis of a response to the polling packet and completing a device setting according to the selected operation mode before the entire packet communication device or a part of the packet communication device which is influenced by the selection of the operation mode starts a service to the external device, by the packet communication device.

According to a fourth exemplary aspect of the present invention, there is provided a packet communication method including: recognizing a connection to the external device and receiving a broadcast packet issued by the connected external device, by a packet communication device; and selecting an operation mode conforming to a connection environment to the external device on the basis of information on a connection condition given by the broadcast packet and completing a device setting according to the selected operation mode before the entire packet communication device or a part of the packet communication device which is influenced by the selection of the operation mode starts a service to the external device, by the packet communication device.

According to a fifth exemplary aspect of the present invention, there is provided a packet communication program which causes a computer included in a packet communication device to execute a process of recognizing an external device connected to the packet communication device and issuing a polling packet to the connected external device, a process of selecting an operation mode conforming to a connection environment to the external device on the basis of a response to the polling packet, and a process of completing a device setting according to the selected operation mode before the entire packet communication device or a part of the packet communication device which is influenced by the selection of the operation mode starts a service to the external device.

According to a sixth exemplary aspect of the present invention, there is provided a packet communication program which causes a computer included in a packet communication device to execute: a process of recognizing an external device connected to the packet communication device and receiving a broadcast packet from the connected external device; a process of selecting an operation mode conforming to a connection environment to the external device on the basis of information on a connection condition to the external device given by the broadcast packet and a process of completing a device setting according to the selected operation mode before the entire packet communication device or a part of the packet communication device which is influenced by the selection of the operation mode starts a service to the external device.

DESCRIPTION OF EXEMPLARY EMBODIMENTS

Exemplary embodiments of the present invention will be described below with reference to the accompanying drawings.

First Exemplary Embodiment

Figure 1:
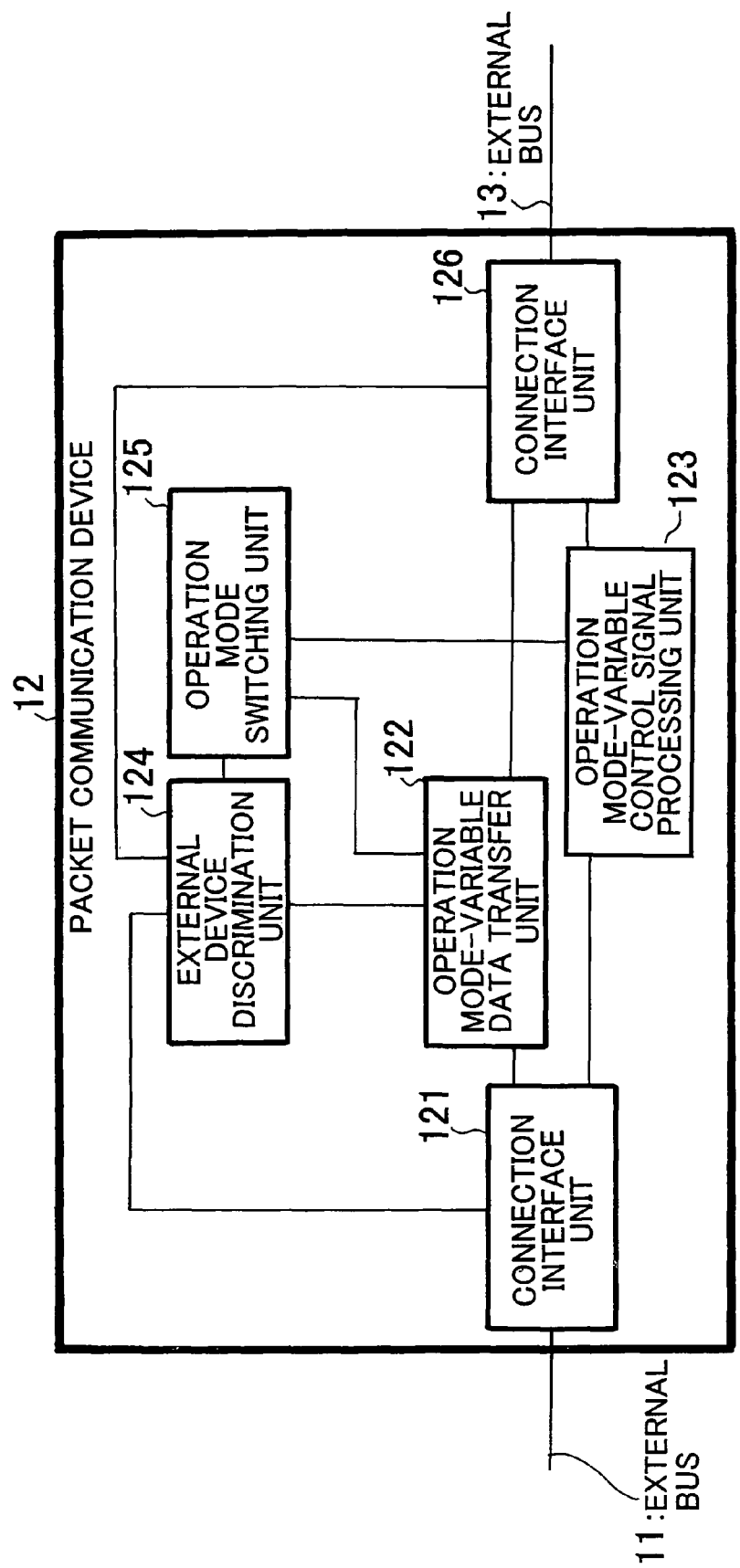
FIG. 1 is a block diagram showing a configuration according to a first exemplary embodiment of the present invention.

FIG. 1 is a block diagram showing a configuration of a first embodiment to carry out the present invention.

With reference to FIG. 1, in the first exemplary embodiment of the present invention, a packet communication device 12 is connected to an external bus 11 and an external bus 13. The packet communication device 12 includes a connection interface unit 121, an operation mode variable data transfer unit 122, an operation mode variable control signal processing unit 123, an external device discrimination unit 124, an operation mode switching unit 125, and a connection interface unit 126. The connection interface unit 121 is connected to the external bus 11. The operation mode variable data transfer unit 122 transfers a packet to a destination. The operation mode variable control signal processing unit 123 receives a device control packet and controls the device on the basis of the control designation. The external device discrimination unit 124 issues a polling packet and discriminates an external device connected to the device on the basis of the response packet. The operation mode switching unit 125 switches operation modes of the packet communication device 12. The connection interface unit 126 is connected to the external bus 13.

The connection interface units 121 and 126 provide functions of a network physical layer and a data link layer to be connected to the external buses 11 and 13. The network physical layer determines an electric connection when the interface units are connected to the external bus 11 and the external bus 13, and an encoding method of a signal. The data link layer provides function of designation of an external device to be connected, credit control in packet communication, or retransmission control of a packet as needed.

The connection interface units 121 and 126 are connected to external devices through the external buses 11 and 13, and, when the external buses 11 and 13 are set in link-up state, notify the external device discrimination unit 124 of a change in link state, that is, connection to the external devices.

The operation mode variable data transfer unit 122 receives packets received from the external buses 11 and 13 by the packet communication device 12 or a polling packet issued by the external device discrimination unit 124 and transfers the packet to a destination of the packet. The operation mode variable data transfer unit 122 can select an operation mode of the packet communication device 12 according to a connection environment of the packet communication device 12 to an external device.

The operation mode variable control signal processing unit 123 receives control packets received from the external buses 11 and 13 by the packet communication device 12 and controls the packet communication device 12. The operation mode variable control signal processing unit 123 can also selects an operation mode of the packet communication device 12 according to the connection environment of the packet communication device 12 to the external device.

The external device discrimination unit 124 issues a polling packet to the external buses 11 and 13 through the operation mode variable data transfer unit 122, examines the connection environment of the packet communication device 12 on the basis of a response packet from the connected external device and notifies the operation mode switching unit 125 of the connection environment.

The operation mode switching unit 125 switches operation modes of the packet communication device 12 according to the connection environment of the packet communication device 12 to the external device. More specifically, the operation mode switching unit 125 notifies the operation mode variable data transfer unit 122 and the operation mode variable control signal processing unit 123 of the selected operation mode.

Figure 2:
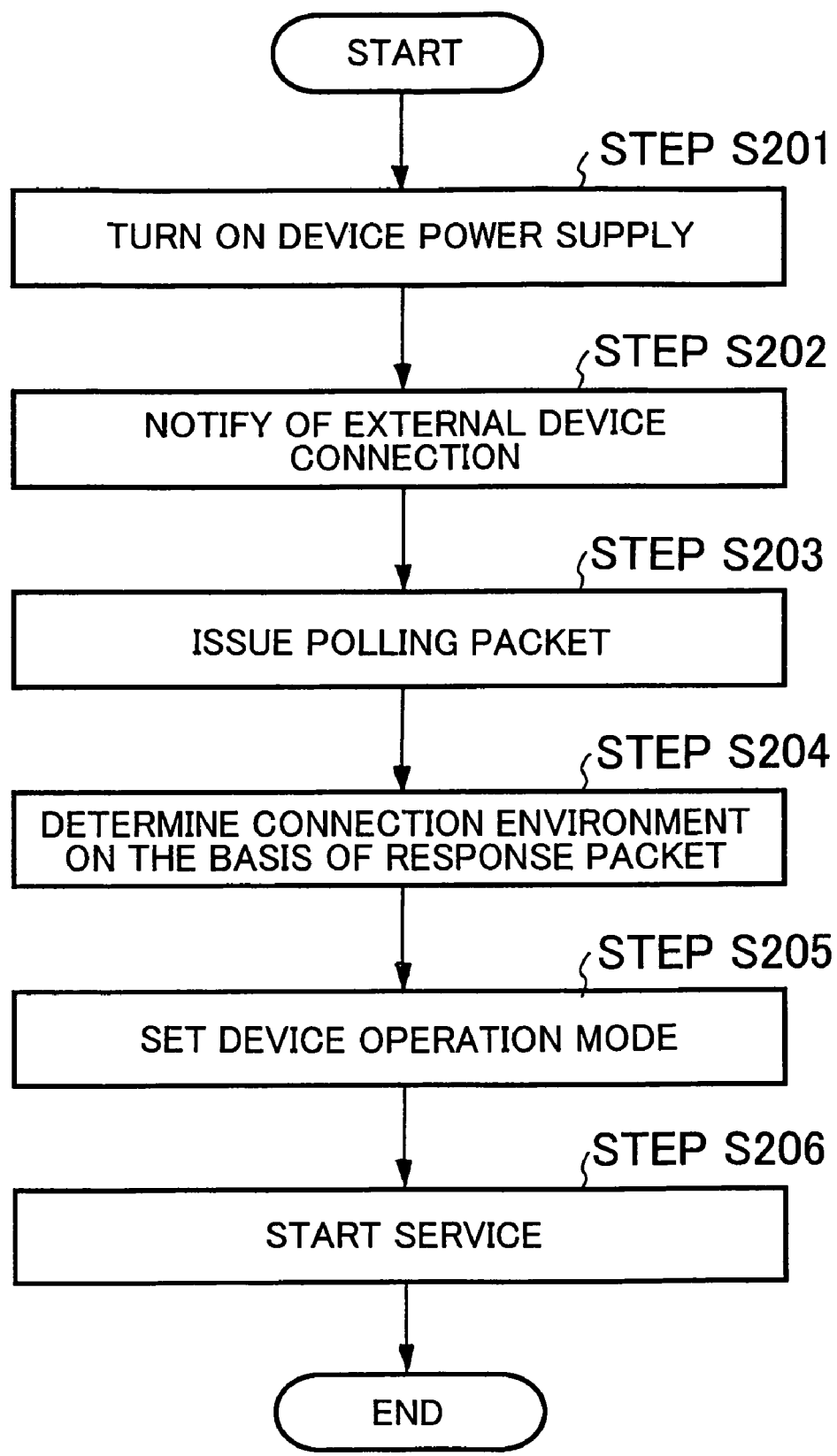
FIG. 2 is a flow chart showing an operation of the first exemplary embodiment of the present invention.

An operation of the first exemplary embodiment of the present invention will be described in detail with reference to FIGS. 1 and 2.

When a power supply of the packet communication device 12 is turned on (step S201), when both the external buses 11 and 13 are connected to the external devices, the external device discrimination unit 124 is notified that the connection interface units 121 and 126 are connected to the external devices (step S202). The external device discrimination unit 124 issues a polling packet to both the external devices (step S203) to examine the connection environment of the packet communication device 12 to the external device (step S203), and the external device discrimination unit 124 determines the connection environment on the basis of response packets from the external devices (step S204). The operation mode switching unit 125 selects an operation mode appropriate to the external connection environment notified by the external device discrimination unit 124, and controls operation modes of the operation mode variable data transfer unit 122 and the operation mode variable control signal processing unit 123 serving as constituent elements of the packet communication device 12 (step S205). With the above steps, setting of the operation mode of the packet communication device 12 is completed, and the packet communication device 12 starts a service to the external device to which the packet communication device 12 is connected (step S206).

The operations in steps S201 to S205 are performed immediately after the power supply of the packet communication device 12 is turned on. For this reason, these steps are completed before unconformity of an operation mode or switching of operation modes of the packet communication device 12 to the external device to which the packet communication device 12 is connected is detected.

In the exemplary embodiment, the external device discrimination unit 124 notifies the operation mode switching unit 125 of the examined connection environment after the external device discrimination unit 124 receives response packets from both the external devices connected to the external buses 11 and 13, and the operation mode switching unit 125 controls the operation mode of the packet communication device 12. However, independent operation modes of the external buses 11 and 13 can also be set. In this case, the external device discrimination unit 124 need not wait for the response packets from both the external devices connected to the external buses 11 and 13. In each of the external buses, in the order of reception of the response packets, the external device discrimination unit 124 may notify the operation mode switching unit 125 of the connection environment, and the operation mode switching unit 125 may sequentially switch operation modes corresponding to the external buses of the packet communication device 12.

Furthermore, in the explanation of the exemplary embodiment, the external device discrimination unit 124 issues polling packets to the external buses 11 and 13. However, for example, a device to which the external bus 11 is to be connected may be determined in advance, and a polling packet may be issued to only the external bus 13.

Still furthermore, in the explanation of the exemplary embodiment, the number of external buses to which the packet communication device 12 is connected is two. However, the number of buses is not limited to two.

Still furthermore, in the explanation of the exemplary embodiment, as portions of the device for switching operation modes, the operation mode variable data transfer unit 122 and the operation mode variable control signal processing unit 123 are shown. However, as an object the operation modes of which are switched, the operation mode variable data transfer unit 122, the operation mode variable control signal processing unit 123 and another portion included in the device may be included. As a matter of course, operation modes of the entire devices may be switched.

Still furthermore, in the exemplary embodiment, an appropriate operation mode is selected when the power supply of the device is turned on. However, after the power supply of the device is turned on, an operation mode may be selected when the external device is newly hot-plugged to the external bus 11 or 13. In this case, after the external device is hot-plugged to the external bus, a polling packet is issued to the external device, and an operation mode appropriate to a service provided to the external device to which the packet communication device 12 is connected is selected. At this time, since the entire device or a portion of the device which is influenced by the selection of the operation mode completes a device setting according to the operation mode selected before a service is started to the external device, unconformity or transition of the operation mode to the external device is not recognized.

Still furthermore, in the exemplary embodiment, a polling packet is issued to the external device to which the packet communication device 12 is connected, and a connection environment to the external device is examined on the basis of the response packet. However, when the external device broadcasts information on the connection condition, the packet communication device 12 need not issue the polling packet. The packet communication device 12 receives the information (broadcast packet) to be broadcasted and setting of the device is autonomously completed according to the information.

The effect of the first exemplary embodiment of the present invention will be described below.

In the first exemplary embodiment, the packet communication device 12 discriminates an external device to be connected by using a polling packet before a service is started to an external device to which the packet communication device 12 is connected, and autonomously completes a setting of an appropriate operation mode conforming to a connection environment to the external device. Consequently, a device which autonomously selects an appropriate operation mode is provided, and a physical device or dedicated software to select operation modes isn't needed. In addition, the possibility of selecting an operation mode of an inappropriate device during a system operation by an erroneous operation of an administrator or a bug of management software is eliminated.

Second Exemplary Embodiment

A second exemplary embodiment of the present invention will be described below in detail with reference to the accompanying drawings.

Figure 3:
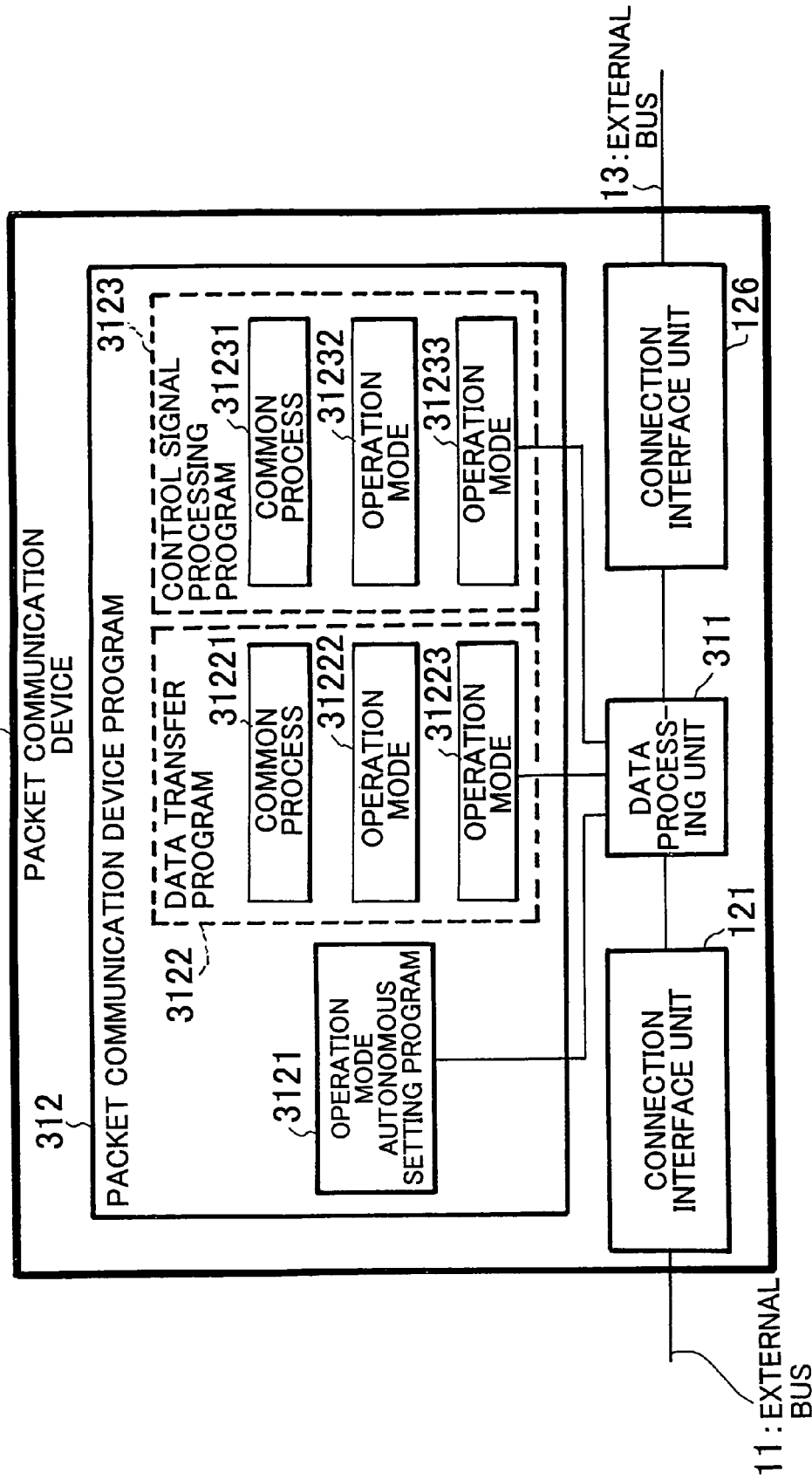
FIG. 3 is a block diagram showing a configuration of a second exemplary embodiment of the present invention.

Referring to FIG. 3, in a second exemplary embodiment of the present invention, a packet communication device 31 is connected to external buses 11 and 13. The packet communication device 31 includes connection interface units 121 and 126, a data processing unit 311, and a packet communication device program 312. The connection interface units 121 and 126 is connected to external buses 11 and 13, respectively. The data processing unit 311 performs processing of a packet received by the packet communication device 31 or control of the device. The packet communication device program 312 controls an operation of the data processing unit 311 according to a connection environment of the packet communication device 31 to the external device.

The packet communication device program 312 includes an operation mode autonomous setting program 3121, a data transfer program 3122, and a control signal processing program 3123. The operation mode autonomous setting program 3121 determines a connection environment of the packet communication device 31 to the external device and controls an operation mode of the device. The data transfer program 3122 provides packet transfer method corresponding to a plurality of operation modes of the packet communication device 31. The control signal processing program 3123 provides processing method of control packets corresponding to the plurality of operation modes. Furthermore, the data transfer program 3122 includes a common process 31221 which is a program portion being common in the operation modes, an operation mode 31222 and an operation mode 31223 which are programs independently corresponding to each of the operation modes. Similarly, the control signal processing program 3123 includes a common process 31231 which is a program portion being common in the operation modes, and an operation mode 31232 and an operation mode 31233 which are programs independently corresponding to operation modes.

The operation mode autonomous setting program 3121 causes the data processing unit 311 to issue polling packets to the external buses 11 and 13 to examine a connection environment of the packet communication device 31 to the external device on the basis of the response packet. Subsequently, the operation mode autonomous setting program 3121 causes the data processing unit 311 to select a program of an appropriate operation mode from the programs corresponding to the operation modes included in the data transfer program 3122 and the control signal processing program 3123 according to the connection environment of the packet communication device 31 to the external device determined on the basis of the response packet.

The data transfer program 3122 provides a program portion corresponding to the operation mode selected by the data processing unit 311 on the basis of the operation mode autonomous setting program 3121, causes the data processing unit 311 to determine destinations of packets received from the external buses 11 and 13, and transfers the packets to the destinations.

The control signal processing program 3123 provides a program portion corresponding to the operation mode selected by the data processing unit 311 on the basis of the operation mode autonomous setting program 3121, and causes the data processing unit 311 to receive the control packets received from the external buses 11 and 13 and to control the data communication device 31 depending on designations described in the received control packets.

The data processing unit 311 carries out, under the control of the packet communication device program 312, the same processes as those in the operation mode variable data transfer unit 122, the operation mode variable control signal processing unit 123, the external device discrimination unit 124, and the operation mode switching unit 125 in the first exemplary embodiment. Furthermore, when the external devices are connected to the external buses 11 and 13 to shift the buses to link-up states, the connection interface units 121 and 126 notify the data processing unit 311 of the state changes.

In this exemplary embodiment, as in the first exemplary embodiment, in selection of an operation mode, not only a setting of one operation mode as the packet communication device 31, but also a setting of independent operation modes for the external buses can be performed. The settings of the operation modes, as in the first exemplary embodiment, can be performed when the power supply of the packet communication device 31 is turned on and when a new device is hot-plugged to the external bus 11 or 13. In any case, the settings of the operation modes are completed before the entire device and a portion of the device which is influenced by the selection of the operation modes starts a service to an external device to which the device is connected.

Furthermore, in the explanation of the exemplary embodiment, the data processing unit 311 issues polling packets to the external buses 11 and 13. However, for example, a device to which the external bus 11 is to be connected may be determined in advance, and a polling packet may be issued to only the external bus 13.

Still furthermore, in the explanation of the exemplary embodiment, the number of external buses to which the packet communication device 31 are connected are two. However, the present invention is not limited to the number of buses.

Still furthermore, the exemplary embodiment describes a configuration in which the data transfer program 3122 and the control signal processing program 3123 include program portions independently corresponding to the two operation modes, respectively. However, in the present invention, the number of operation modes is not limited to two.

Still furthermore, in the exemplary embodiment, a polling packet is issued to the external device to which the packet communication device 31 is connected, and a connection environment to the external device is examined on the basis of the response packet. However, when the external device broadcasts information on the connection condition, the packet communication device 31 need not issue the polling packet. The information (broadcast packet) to be broadcasted may be received, and setting of the device may be autonomously completed depending on the information.

The effect of the second exemplary embodiment is the same as that in the first embodiment.

Exemplary examples of the present invention will be described below with reference to the accompanying drawings.

Exemplary Example 1

A first exemplary example of the present invention will be described below with reference to the accompanying drawings. The first exemplary example corresponds to the first exemplary embodiment.

Figure 4:
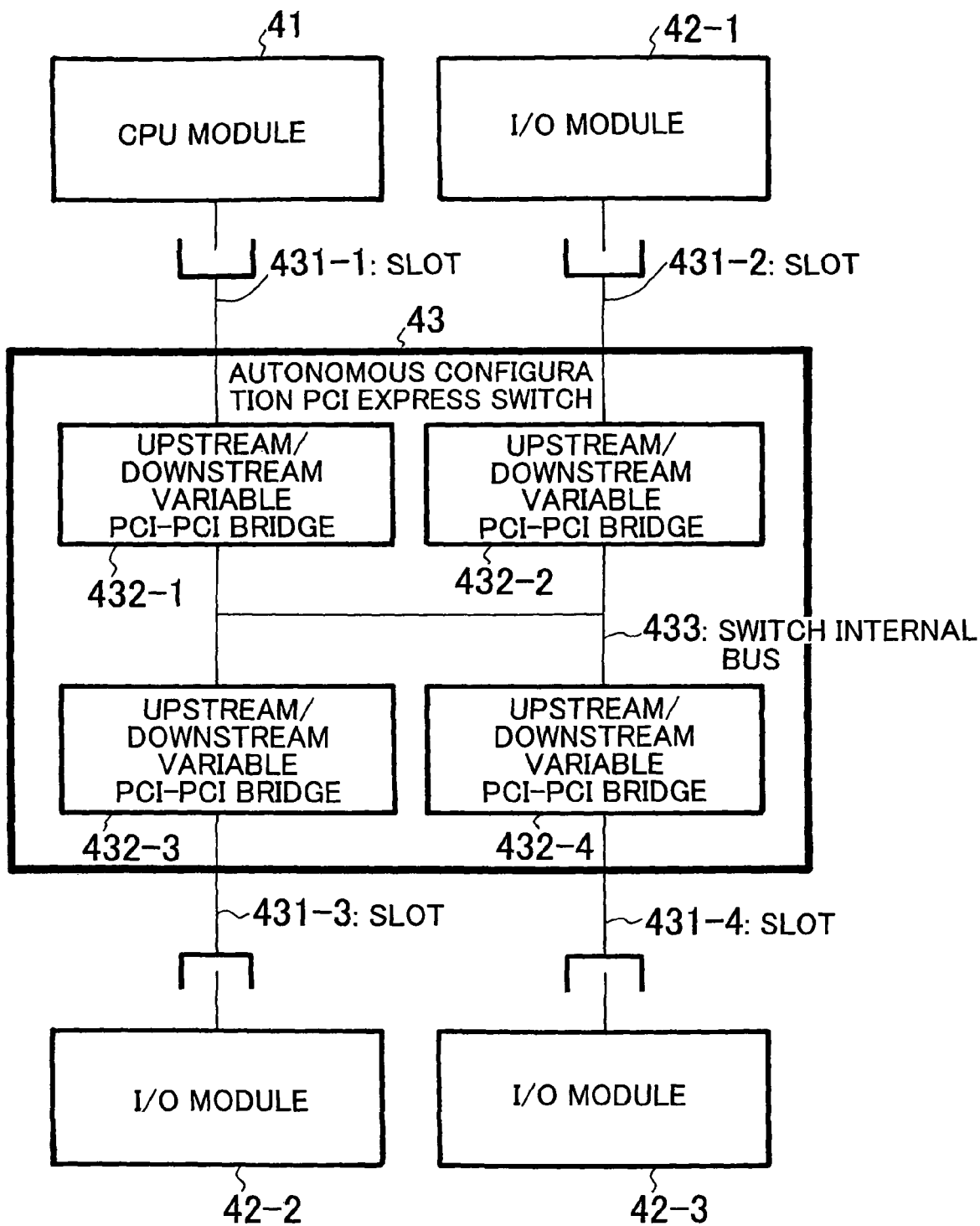
FIG. 4 is a diagram for explaining the first exemplary example of the present invention.

Referring to FIG. 4, the first exemplary example includes an autonomous configuration PCI express switch 43, and a CPU module 41 and I/O modules 42-1 to 42-3 which are connected to each other by using the autonomous configuration PCI express switch 43. The autonomous configuration PCI express switch 43 includes slots 431-1 to 431-4 which accommodate modules therein, upstream/downstream variable PCI-PCI bridges 432-1 to 432-4 which provide interface functions to be connected to the modules, and a switch internal bus 433 which connects the upstream/downstream variable PCI-PCI bridges 432-1 to 432-4 to each other.

Figure 5:
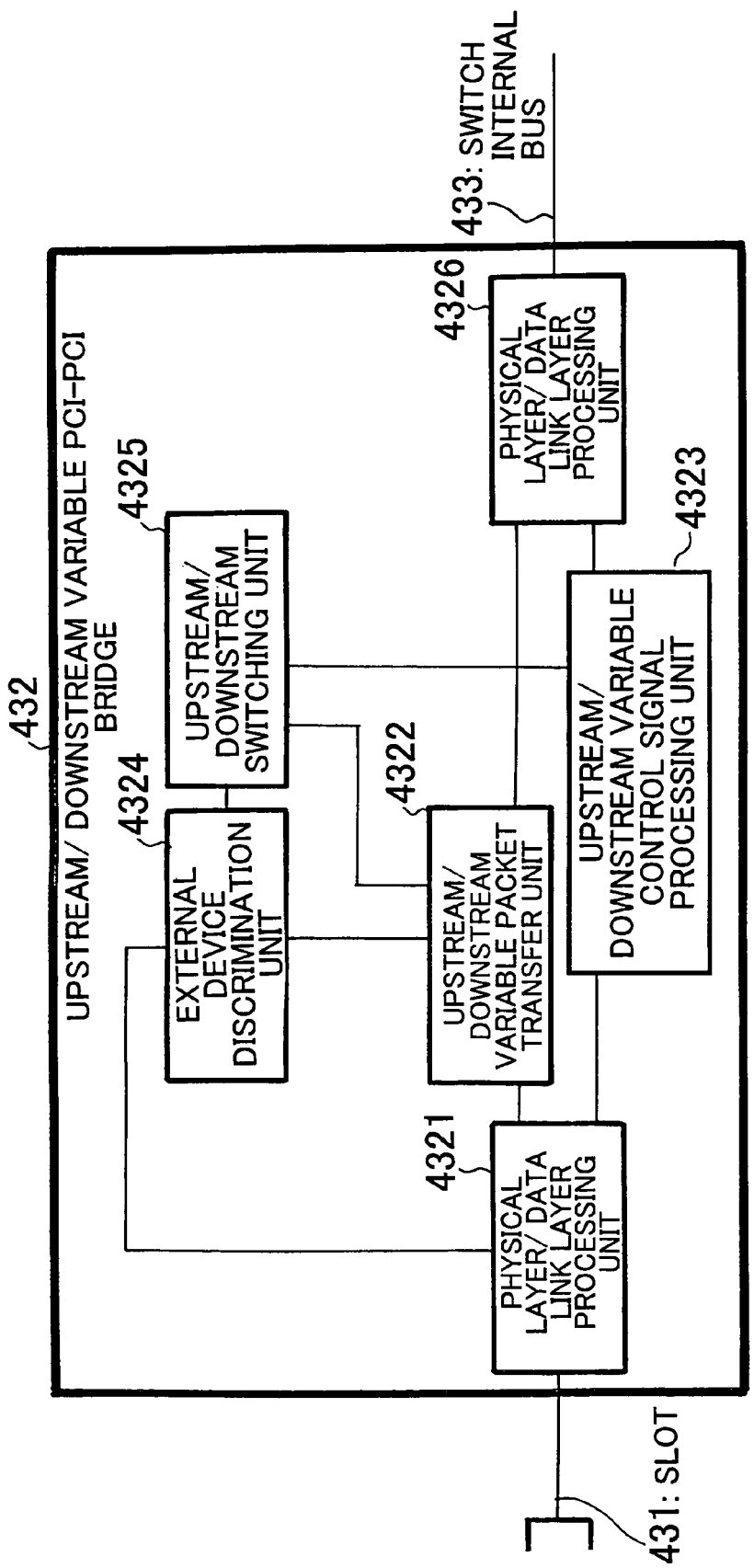
FIG. 5 is a diagram for explaining the first exemplary example of the present invention.

The upstream/downstream variable PCI-PCI bridges 432-1 to 432-4 correspond to the packet communication device 12 according to the first exemplary embodiment of the present invention shown in FIG. 1. FIG. 5 is a block diagram of one internal configuration of the upstream/downstream variable PCI-PCI bridges 432-1 to 432-4. The upstream/downstream variable PCI-PCI bridges 432-1 to 432-4 have the same internal configurations. In FIG. 5, an upstream/downstream variable PCI-PCI bridge 432 shows one configuration of the upstream/downstream variable PCI-PCI bridges 432-1 to 432-4.

Referring to FIGS. 1 and 5, the upstream/downstream variable PCI-PCI bridge 432 includes a physical layer/data link layer processing unit 4321 serving as the connection interface unit 121, an upstream/downstream variable packet transfer unit 4322 serving as the operation mode variable data transfer unit 122, an upstream/downstream variable control signal processing unit 4323 serving as the operation mode variable control signal processing unit 123, an external device discrimination unit 4324 serving as the external device discrimination unit 124, an upstream/downstream switching unit 4325 serving as the operation mode switching unit 125, and a physical layer/data link layer processing unit 4326 serving as the connection interface unit 126.

In the first exemplary example, the external bus 11 corresponds to a slot 431, and the external bus 13 corresponds to the switch internal bus 433. In this case, the slot 431 represents one of the slots 431-1 to 431-4.

The upstream/downstream variable PCI-PCI bridge 432 is autonomously switched to the upstream mode when the CPU module 41 is connected to the slot 431, and the upstream/downstream variable PCI-PCI bridge 432 is autonomously switched to the downstream mode when the I/O module 42 is connected to the slot 431. More specifically, in the configuration in FIG. 4, the upstream/downstream variable PCI-PCI bridge 432-1 is switched to the upstream mode since the CPU module 41 is connected to the slot 431-1, and the upstream/downstream variable PCI-PCI bridge 432-2 is switched to the downstream mode since the I/O module 42-1 is connected to the slot 431-2.

Since the operation is performed immediately after the power supply to the system is turned on, the switching is completed when data passes through the autonomous configuration PCI express switch 43 when the I/O modules 42-1 to 42-3 are initialized by a BIOS of the CPU module 41.

When the I/O module 42-1 is extracted from the slot 431-2, during an operation of the CPU module 41, the I/O module 42-1 is newly hot-plugged to the slot 431-2 of the autonomous configuration PCI express switch 43. Even though the I/O module 42-1 is connected to the CPU module 41 in operation, interrupt of a hot plug conforming to the standard specifications of PCI express is performed after a switching operation of the upstream/downstream variable PCI-PCI bridge 432-2 is completed.

An operation of a constituent element of the upstream/downstream variable PCI-PCI bridge 432 will be described below with reference to FIG. 5. In the first exemplary example, an operation mode of the upstream/downstream variable PCI-PCI bridge 432 is determined depending on whether a module connected to the slot 431 is the CPU module 41 or the I/O module 42, and connection on the switch internal bus 433 does not influence the selection of the operation mode. Therefore, a polling packet is issued to only the slot 431 side.

When the power supply of the system is turned on, when a module is connected to the slot 431, or when a new module is hot-plugged to the slot 431 in the power-on state, the physical layer/data link layer processing unit 4321 notifies the external device discrimination unit 4324 of transition to a link up state. By the notification, the external device discrimination unit 4324 generates a configuration read request packet to transmit the configuration read request packet to a module (the CPU module 41 or one of the I/O modules 42-1 to 42-3) connected to the slot 431 through the upstream/downstream variable packet transfer unit 4322.

In the standard specifications of the PCI express, since the configuration read request packet is a packet permitted to be issued from the upstream to the downstream, when a module to be connected to the slot 431 is the I/O module 42, a packet in which device information is described is returned. However, when the module is the CPU module 41, a packet which notifies the device of an unsupported request is returned. The external device discrimination unit 4324 determines on the basis of these responses whether the module connected to the slot 431 is the CPU module 41 or the I/O module 42 (one of the I/O modules 42-1 to 42-3), and notifies the upstream/downstream switching unit 4325 of the determination result. The upstream/downstream switching unit 4325 switches operation modes of the upstream/downstream variable PCI-PCI bridge 432 on the basis of the notification.

When the CPU module 41 is connected to the slot 431, the upstream/downstream variable PCI-PCI bridge 432 operates as an upstream PCI-PCI bridge. When the I/O module 42 is connected to the slot 431, the upstream/downstream variable PCI-PCI bridge 432 operates a downstream PCI-PCI bridge.

Exemplary Example 2

A second exemplary example of the present invention will be described below with reference to the accompanying drawings. The second exemplary example corresponds to the second exemplary embodiment.

Figure 6:
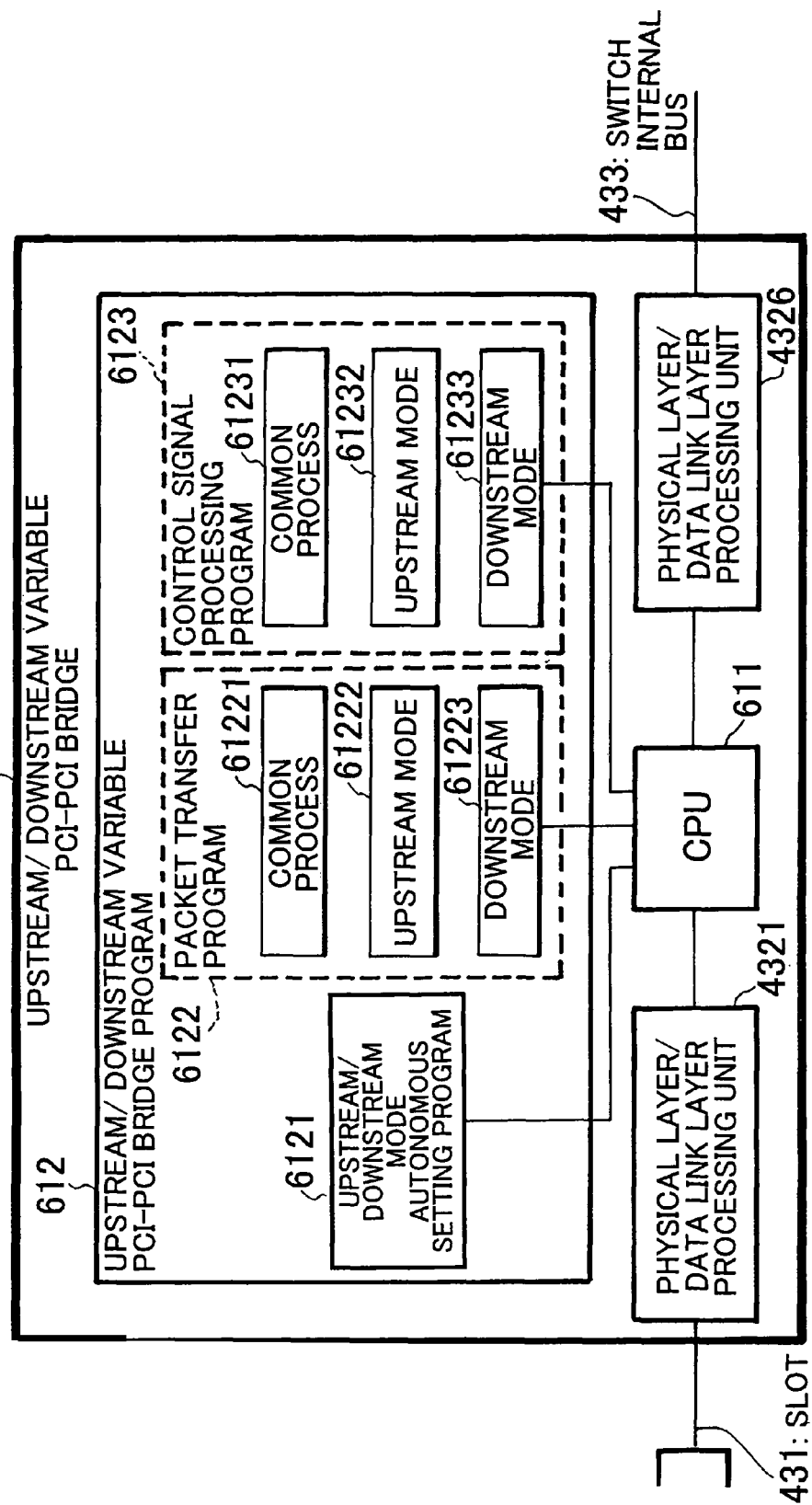
FIG. 6 is a diagram for explaining the second exemplary example of the present invention.
Figure 7:
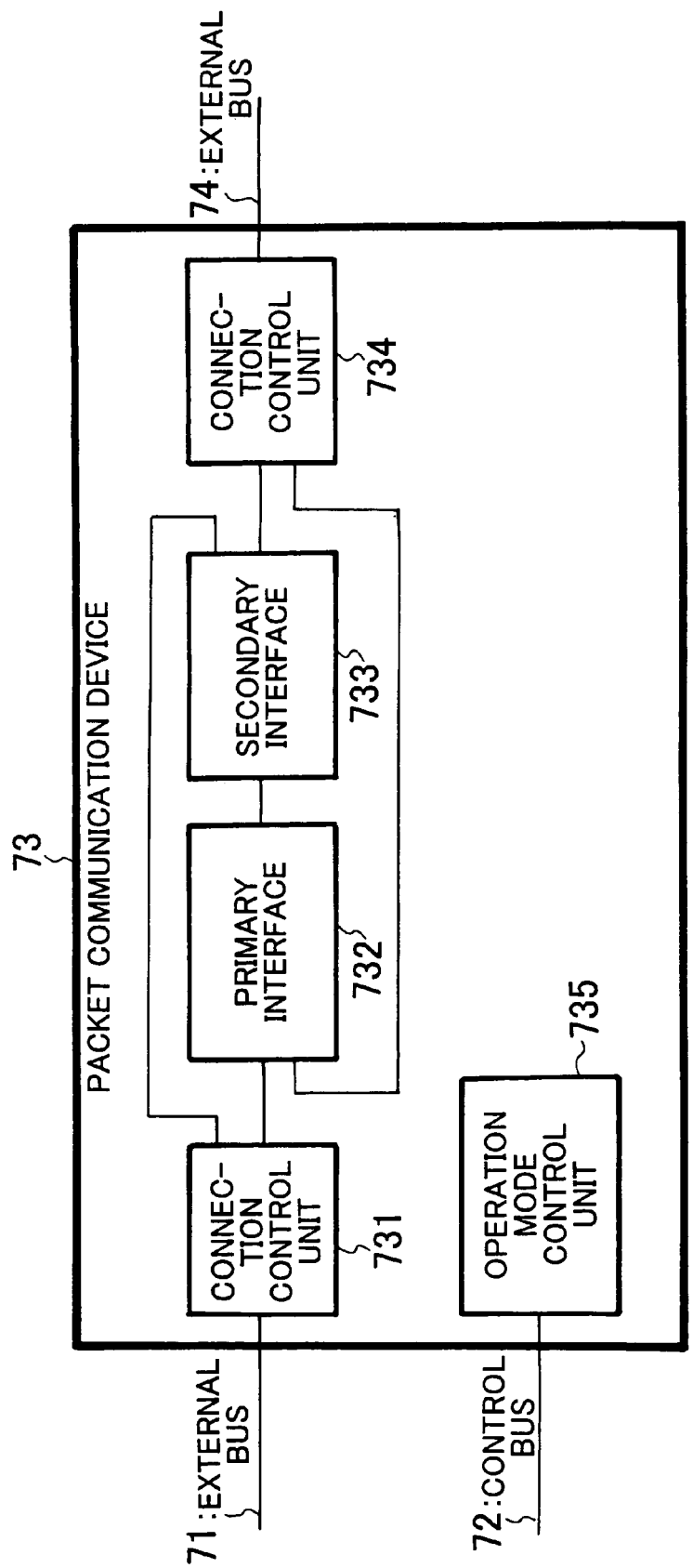
FIG. 7 is a block diagram showing a configuration of a related art.

The second exemplary example is different from the first exemplary example in that, in place of the upstream/downstream variable PCI-PCI bridge 432 according to the first exemplary example shown in FIG. 4, an upstream/downstream variable PCI-PCI bridge 61 shown in FIG. 6 is included.

Referring to FIGS. 3 and 6, the upstream/downstream variable PCI-PCI bridge 61 includes a physical layer/data link layer processing unit 4321 serving as the connection interface unit 121, a CPU 611 serving as the data processing unit 311, an upstream/downstream variable PCI-PCI bridge program 612 serving as the packet communication device program 312, and a physical layer/data link layer processing unit 4326 serving as the connection interface unit 126. The upstream/downstream variable PCI-PCI bridge program 612 includes an upstream/downstream mode autonomous setting program 6121 serving as the operation mode autonomous setting program 3121, a packet transfer program 6122 serving as the data transfer program 3122, and a control signal processing program 6123 serving as the control signal processing program 3123. The packet transfer program 6122 includes a common process 61221 serving as the common process 31221, an upstream mode 61222 serving as the operation mode 1 31222, and a downstream mode 61223 serving as the operation mode 2 31223. The control signal processing program 6123 includes a common process 61231 serving as the common process 31231, an upstream mode 61232 serving as the operation mode 31232, and a downstream mode 61233 serving as the operation mode 31233.

An operation of a constituent element of the upstream/downstream variable PCI-PCI bridge 61 will be described below with reference to FIG. 6. In the second exemplary example, as in the first exemplary example, an operation mode of the upstream/downstream variable PCI-PCI bridge 61 is determined depending on whether a module connected to the slot 431 is the CPU module 41 or the I/O module 42, and the connection on the switch internal bus 433 does not influence the selection of the operation mode. Therefore, a polling packet is issued to only the slot 431 side.

As the power supply of the system is turned on, when a module is already connected to the slot 431, or when a new module is hot-plugged to the slot 431 in a power-on state, the physical layer/data link layer processing unit 4321 notifies the CPU 611 of transition of a link-up state. By the notification, the CPU 611, under the control of the upstream/downstream mode autonomous setting program 6121, generates a configuration read request packet and transmits the configuration read request packet to a module (the CPU module 41 or one of the I/O modules 42-1 to 42-3) connected to the slot 431. At this time, as in the first exemplary example, when the module connected to the slot 431 is the I/O module 42, a packet in which device information is described is returned. However, the module is the CPU module 41, a packet which notifies an unsupported request is returned.

The CPU 611 discriminates a module connected to the slot 431 on the basis of these responses and selects a program of an appropriate operation mode included in the packet transfer program 6122 and control signal processing program 6123 used in subsequent services. When the CPU module 41 is connected to the slot 431, the upstream/downstream variable PCI-PCI bridge 61 operates by using programs of the common process 61221, the upstream mode 61222, the common process 61231, and the upstream mode 61232. When the I/O module 42 is connected to the slot 431, the upstream/downstream variable PCI-PCI bridge 61 operates by using the common process 61221, the downstream mode 61223, the common process 61231, and the downstream mode 61233.

The upstream/downstream variable PCI-PCI bridge program 612 in the second exemplary example is stored in a storage element such as a ROM (Read On Memory), and an execution process of the upstream/downstream variable PCI-PCI bridge program is performed by the CPU (Central Processing Unit) 611. The data required for the execution process is stored in a random access memory (RAM). The CPU 611, the ROM, and the RAM constitute a computer. The ROM serves as a computer readable medium containing the upstream/downstream variable PCI-PCI bridge program (program product) 612. A computer readable medium may be a CDROM, a semiconductor memory such as a flash memory, or a DVD which the upstream/downstream variable PCI-PCI bridge program 612 is storage.

In each of the exemplary examples described above, the selection of the operation mode is selection on a connection configuration of a bus connection, that is, selection between an upstream mode and a downstream mode. However, as the selection, selection of a communication speed of a packet used in communication may be used.

For example, the present invention can be applied to cause a device connected to a system bus or an I/O bus in a computer system or a network system to autonomously set an appropriate operation mode. When an external bus is understood as a link of a network, the present invention can be applied to cause a device in a network system to autonomously set an appropriate mode.

Although the exemplary embodiments and exemplary examples of the present invention have been described in detail, they should be understood that various changes, substitutions and alternatives can be made therein without departing from the spirit and scope of the invention as defined by the appended claims. Further, they are the inventor's intent to retain all equivalents of the claimed invention even if the claims are amended during prosecution.

What is claimed is:

1. A packet communication device comprising:
   a connection interface unit for connecting to an external device;
   an external device discrimination unit which receives a notice of a connection to the external device from the connection interface unit, transmits a polling packet to the connected external device and determines whether the connected external device is an upstream device or a downstream device on the basis of a response packet to the polling packet; and
   an operation mode switching unit which switches to an upstream mode if the connected external device is the upstream device and switches to a downstream mode if the connected external device is the downstream device, the operation mode switching unit performing only any one of the switching to the upstream mode and the switching to the downstream mode on the basis of the determination by the external device discrimination unit, the switching to the upstream mode and the switching to the downstream mode being done independently of each other.

2. The packet communication device according to claim 1, wherein the operation mode is related to operations of a data transfer unit which transfers a received packet and a control signal processing unit which processes a control signal for the packet communication device.

3. The packet communication device according to claim 1, wherein
   transmission of the polling packet to only an upstream or a downstream of the connection bus connected to the external device is permitted by standard specifications.

4. The packet communication device according to claim 3, wherein the standard specifications are a PCI express.

5. The packet communication device according to claim 1, wherein the bus connection is a PCI express.

6. The packet communication device according to claim 5, wherein selection of the operation mode is selection of a mode on an upstream PCI-PCI bridge and a downstream PCI-PCI bridge in a PCI express bridge.

7. A packet communication method comprising:
   recognizing a connection to an external device and issuing a polling packet to the connected external device, by a packet communication device;
   determining whether the connected external device is an upstream device or a downstream device on the basis of a response to the polling packet;
   switching to an upstream mode if the connected external device is the upstream device, and to a downstream mode if the connected external device is the downstream device, only any one of the switching to the upstream mode and the switching to the downstream mode being performed on the basis of the determined result, the switching to the upstream mode and the switching to the downstream mode being done independently of each other; and
   completing a device-setting according to the switched mode before the entire packet communication device or a part of the packet communication device which is influenced by the switching starts a service to the external device, by the packet communication device.

8. The packet communication method according to claim 7, wherein the operation mode is related to a data transfer method of transferring a received packet and a control signal processing method of processing a control signal.

9. The packet communication method according to claim 7, wherein
   transmission of the polling packet to only an upstream or a downstream of the connection bus connected to the external device is permitted by standard specifications.

10. The packet communication method according to claim 9, wherein the standard specifications are a PCI express.

11. The packet communication method according to claim 7, wherein the bus connection is a PCI express.

12. The packet communication method according to claim 11, wherein selection of the operation mode is selection of a mode on an upstream PCI-PCI bridge and a downstream PCI-PCI bridge in a PCI express bridge.

13. A non-transitory computer-readable storage medium storing a packet communication program which causes a computer included in a packet communication device to execute
   a process of recognizing an external device connected to the packet communication device and issuing a polling packet to the connected external device, a process of determining whether the connected external device is an upstream device or a downstream device on the basis of a response to the polling packet, a process of switching to an upstream mode of the connected external device is the upstream device, and to a downstream mode if the connected device is the downstream device, only any one of the switching to the upstream mode and the switching to the downstream mode being performed on the basis of the determined result in the process of determining, the switching to the upstream mode and the switching to the downstream mode being done independently of each other, and a process of completing a device-setting according to the switched mode before the entire packet communication device or a part of the packet communication device which is influenced by the switching, starts a service to the external device.

14. The non-transitory computer-readable storage medium according to claim 13, wherein the operation mode is related to operations of a data process of transferring a received packet and a control signal process of processing a control signal to a device.

15. The non-transitory computer-readable storage medium according to claim 13, wherein
transmission of the polling packet to only an upstream or a downstream of the connection bus connected to the external device is permitted by standard specifications.

16. The non-transitory computer-readable storage medium according to claim 15, wherein the standard specifications are a PCI express.

17. The non-transitory computer-readable storage medium according to claim 13, wherein the bus connection is a PCI express.

18. The non-transitory computer-readable storage medium according to claim 17, wherein selection of the operation mode is selection of a mode on an upstream PCI-PCI bridge and a downstream PCI-PCI bridge included in a PCI express bridge.

* * * * *